Patented Jan. 26, 1926.

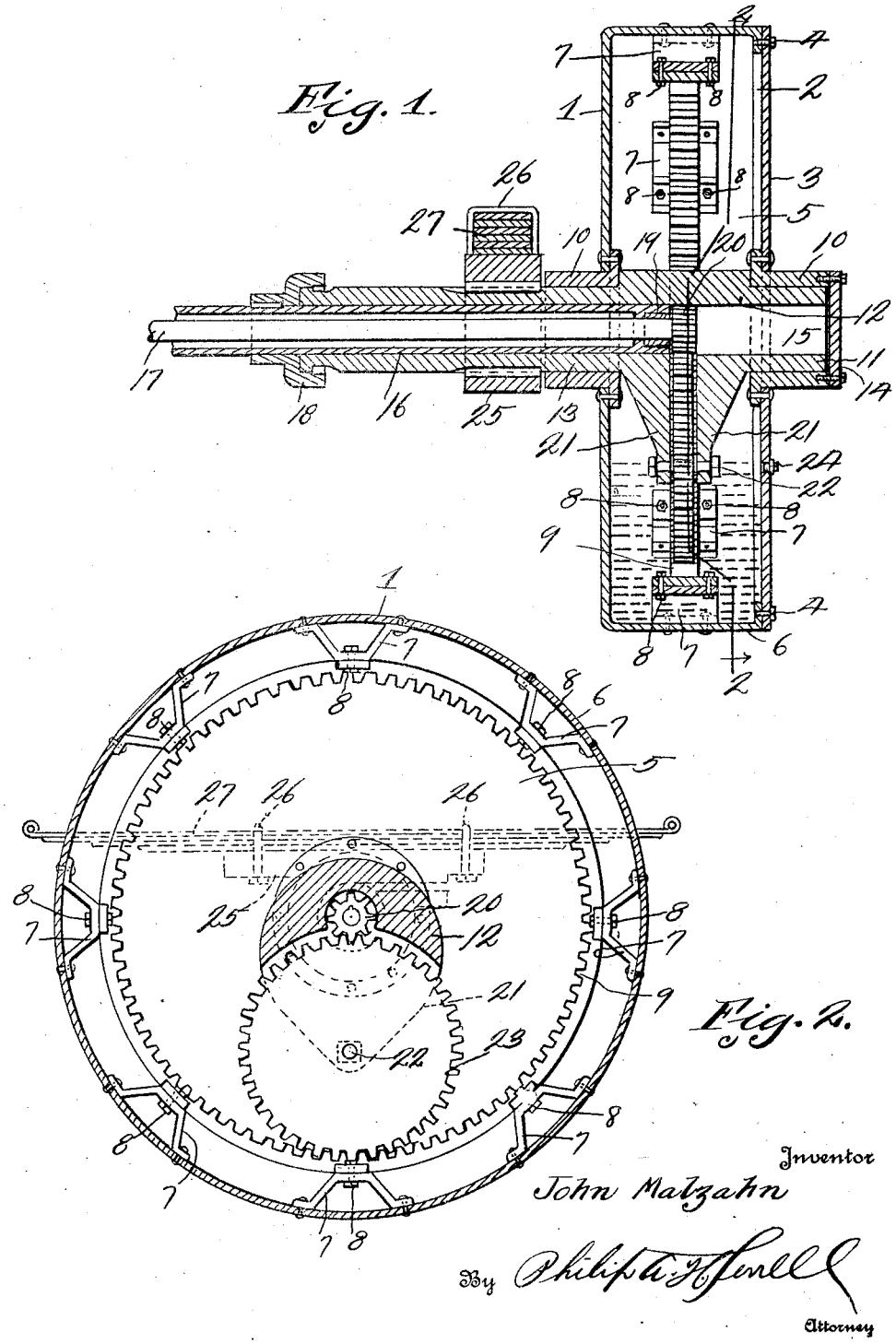

1,570,758

UNITED STATES PATENT OFFICE.

JOHN MALZAHN, OF WESTPOINT, NEBRASKA.

TRACTION WHEEL.

Application filed April 26, 1923. Serial No. 634,755.

*To all whom it may concern:*

Be it known that I, JOHN MALZAHN, a citizen of the United States, residing at Westpoint, in the county of Cuming and State of Nebraska, have invented certain new and useful Improvements in Traction Wheels, of which the following is a specification, reference being had therein to the accompanying drawings.

The invention relates to tractor wheels, and has for its object to provide a device of this character wherein the wheel is hollow and gear driven, and in which hollow wheel lubricant may be placed for thoroughly lubricating the gearing at all times, thereby insuring proper operation of the device, and at the same time excluding foreign matter from the gear, such for instance as dirt and grit.

A further object is to provide an internal gear within the wheel, a drive shaft extending through a casing or housing and provided with the drive pinion, which drive pinion meshes with the intermediate gear, which in turn meshes with the internal gear of the wheel, said pinion and gears being in the same plane, thereby insuring a positive driving action.

A further object is to rotatably mount the wheel on a member carried by the axle housing, which member is provided with a spring perch for the reception of a loose spring, and also has pivotally mounted thereto within the wheel the intermediate gear, thereby forming a compact structure.

A further object is to provide the outer side of the wheel with a removable plate whereby access may be had to the interior of the wheel and also to provide the outer plate with a removable plug threaded into an aperture through which aperture lubricant may be poured into the wheel.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical transverse sectional view through the wheel.

Figure 2 is a vertical longitudinal sectional view through the wheel.

Referring to the drawing, the numeral 1 designates the casing of the wheel, which casing may be formed from a single casting or in any other suitable manner. The casing 1 has its outer side provided with an annular flange 2, to which flange is secured a cover plate 3, by means of bolts 4, which cover plate when removed allows ready access to the chamber 5 of the wheel for repair purposes. Secured to the inner periphery of the tread portion 6 of the casing 1 are members 7, to the inner sides of which are secured by means of bolts 8 an internal gear 9. Secured to the plate 3, and to the inner wall of the casing 1 are bearing collars 10, which collars rotate on the hollow extension 11 of the outer end of the member 12 and on the hollow extension 13 of said member 12, therefore it will be seen that the wheel is mounted on bearings at opposite sides thereof. Sleeve 10, at the outer end thereof and at the outer side of the wheel is provided with a removable plate 14, whereby access may be had to the chamber 15 of the member 14. Disposed within the hollow extension 13 is an axle housing 16, in which housing the axle 17 is rotatably mounted, however the axle housing 16 is connected to the extension 13 by means of the collar 18, which collar not only locks the parts together, but at the same time forms means for preventing lubricant from working out of the extension 13. One end of the axle 17 is rotatably mounted in an antifrictional bearing 19 of the axle housing 16 and terminates in a drive pinion 20, which is disposed in the same plane as the internal gear 9. Extending downwardly from the underside of the member 12 are spaced arms 21, and between which arms is rotatably mounted on a bolt 22 an intermediate gear 23. The gear 23 meshes with the drive pinion 20 and with the internal gear 9, therefore it will be seen that when the drive pinion is rotated by the rotation of the axle 17, the wheel casing, to which is connected the internal gear 9, will also rotate, therefore insuring a positive gear driven wheel, all of the gears of which being disposed within the wheel where they are thoroughly protected from foreign matter such as dirt and grit, and consequently the wear on the teeth of the gears is reduced to a minimum. By disposing all of the gears in the same plane, it will be seen that a positive driving action is obtained, and that by disposing all of the gears between the bearings of the wheel, the driving of the wheel is positive and wobbling will not take place, which will throw the gear teeth out of proper mesh. The plate 3 is provided with a removable plug 24, which when removed allows lubricant to be poured into the chamber 5 of the wheel for lubricating purposes. Disposed on the extension 13 is a spring receiving member 25, to which is secured, by means of U-bolts 26, a leaf spring 27. Leaf spring 27 assists in relieving the shock on the gear mechanism when the tractor goes over rough ground.

From the above it will be seen that a gear driven tractor wheel is provided, which is simple in construction, positive in its operation and one wherein the gears are protected from foreign matter. It will also be seen that the gears will be thoroughly lubricated at all times by lubricant disposed within the chamber of the wheel.

The invention having been set forth what is claimed as new and useful is:—

A tractor wheel comprising a casing having a chamber therein, a member disposed within the casing, the opposite sides of said casing being rotatably mounted on extensions carried by said member, a drive axle extending through one of said extensions, a drive pinion carried by the end of the axle, spaced arms carried by the member within the chamber of the casing, an intermediate gear pivotally mounted between the spaced arms and meshing with the drive pinion, U-shaped members carried by the inner periphery of the casing, an internal gear engaging the inner ends of the U-shaped members, said U-shaped members being wider than the internal gear; oppositely extending lugs carried by the opposite sides of the internal gear and secured to the inner ends of the U-shaped member, said intermediate gear meshing with the internal gear.

In testimony whereof I hereunto affix my signature.

JOHN MALZAHN.